United States Patent Office 3,467,754
Patented Sept. 16, 1969

3,467,754
BRONCHODILATOR EXPECTORANT ELIXIR
Neil H. Mercer and Hugh D. Bryan, Evansville, Ind., assignors to Mead Johnson & Company, Evansville, Ind., a corporation of Indiana
No Drawing. Filed Aug. 10, 1966, Ser. No. 571,425
Int. Cl. A61k 27/00
U.S. Cl. 424—253                    3 Claims

ABSTRACT OF THE DISCLOSURE

A bronchodilator expectorant composition containing a sympathomimetic amine bronchodilator, the xanthine bronchodilator theophylline, guaiacol or a water soluble form thereof and a sedative.

---

U.S. Patent 3,109,773, dated Nov. 5, 1963 of Neil H. Mercer and Robert J. Bequette deals with a bronchodilator-expectorant elixir containing theophylline in highly concentrated liquid dosage form made possible through the solubilizing effect of glyceryl guaiacolate, or other water-soluble form of guaiacol, on the theophylline. Those compositions have the advantage of providing a therapeutic dose of theophylline and glyceryl guaiacolate or equivalent water soluble form of guaiacol in a relatively small volume of elixir which may contain alcohol in sufficient amount to assist in absorption of the theophylline, but in insufficient amount to interfere with patient acceptance. The compositions have solution stability over a wide pH range including acidic conditions. The latter is desirable since considerably more latitude is thereby afforded the flavorist in compounding an acceptably flavored product and because the theophylline remains in solution even under the strongly acid conditions met in the stomach, thus reducing the possibility of gastric irritation.

The present invention provides the solution to a difficult problem encountered in preparing an elixir of the foregoing type retaining each of the advantages thereof relative to palatability, absorption, tolerance, and acceptability, but including therein as additional active ingredients a sympathomimetic amine bronchodilator component, such as ephedrine hydrochloride, and a barbiturate sedative.

Bronchodilator compositions containing both adrenergic and xanthine-type bronchodilator agents to counteract bronchospasm, and a sedative are widely used because of their effectiveness, despite the disadvantages of certain side effects. The sedative serves the purpose of relieving the anxiety to which patients suffering from bronchial asthma are frequently subject and also counteracting the central nervous system stimulating side effects of the sympathomimetic amines which serves as adrenergic bronchodilator components. Phenobarbital is the most widely used sedative in such compositions, although other barbiturates have been used in tablet or capsule dosage forms.

Phenobarbital is generally preferred for such compositions because of its relatively long duration of action providing a continuous calming effect during dosage for chronic conditions. Unfortunately a physical incompatibility between phenobarbital and theophylline is operant which results in their precipitation from solution when it is attempted to incorporate phenobarbital in sedative effective amounts into a theophylline-glyceryl guaiacolate elixir of the type described in U.S. 3,109,773. Apparently the phenobarbital interferes with the solubilizing action of the glyceryl guaiacolate on the theophylline, resulting in precipitation thereof. Furthermore, the phenobarbital is itself rendered insoluble. It is thus impossible to formulate a clear solution free from insoluble suspended ingredients. Solutions are preferred in accordance with the object of providing rapid and uniform absorption without gastric irritation and for convenience and accuracy of administration. The uncertainty of uniform resuspension of insoluble ingredients is an ever-present problem in the administration of drugs as liquid suspensions.

We have found that certain barbiturates form clear solutions when employed in combination with theophylline, ephedrine hydrochloride, and glyceryl guaiacolate. The reason for the specific compatibility which we have discovered is not known since the operability of certain barbiturates does not appear to be a function of their water or alcohol solubilities.

There is provided according to the present invention a bronchodilator expectorant composition containing a sympathomimetic amine bronchodilator such as ephedrine, pseudoephedrine, methoxyphenamine, or protokylol or an acid addition salt thereof; the xanthine bronchodilator theophylline; glyceryl guaiacolate, or a water soluble form thereof such as guaiacol itself, or potassium guaiacol sulfonate; and a sedative component, cyclopal, aprobarbital, butabarbital, or pentobarbital. These ingredients are contained in an aqueous alcoholic vehicle to provide final composition which contains at least 40% by volume of water and up to 20% by volume of ethanol, which shares the advantage of pH stability, palatability, freedom from gastric irritation, and effective absorption with the compositions of U.S. 3,109,773.

The compositions are designed to contain a therapeutically effective dosage of each active ingredient in a dosage volume of up to 2 tablespoons (30 ml.) of elixir. Each 5 ml. unit contains from about ⅙ up to a full therapeutic dose of each ingredient, or more particularly from 16.6 to 175 mg. of theophylline; from 7.5 to 350 mg. of glyceryl guaiacolate, or an equivalent solubilizing weight of potassium guaiacol sulfonate or guaiacol; from 4 to 25 mg. of ephedrine hydrochloride, ephedrine sulfate, or a pharmacologically equivalent amount of one of the previously mentioned sympathomimetic bronchodilators; from 2 to 35 mg. of one of the barbiturates listed above, preferably butabarbital. For the latter, concentrations in the range of 2 to 15 mg./5 ml. are employed. A soluble form of ephedrine, pseudoephedrine, methoxyphenamine, or protokylol is, of course, used. Ephedrine sulfate and ephedrine hydrochloride may be used interchangeably in the amount specified. The concentrations of other adrenergic bronchodilators for use in the present elixirs are adjusted in accordance with accepted dosage practice for each drug.

In its broadest concept, the present bronchodilator expectorant compositions are clear aqueous or aqueous-alcoholic solutions containing at least 40% by volume of water and up to 20% by volume of alcohol, and having dissolved therein 0.83 g. to 4.37 g. of theophylline per 100 ml. of water in the composition, sufficient guaiacol or pharmaceutically acceptable water soluble form thereof to serve as solubilizer for the theophylline, a pharmacologically effective dose of a sympathomimetic bronchodilator, and a sedative dose of a barbiturate selected from 5-allyl-5-cyclopentenylbarbituric acid (cyclopal), 5-allyl-5-isopropylbarbituric acid (aprobarbital), 5-ethyl-5-(2-butyl)barbituric acid (butabarbital), and 5-ethyl-5-(2-pentyl)barbituric acid (pentobarbital).

The foregoing concentration range of theophylline exceeds that of a saturated solution thereof in the solvents selected as vehicles in this invention. It is solubilized in accordance with the invention set forth in U.S. 3,109,773. The aforementioned barbiturates in the concentrations given, in company with the sympathomimetic amine ingredient, are soluble in the composition and surprisingly do not themselves precipitate nor cause precipitation of the theophylline. In order to illustrate the specificity required of the barbiturate for use in the present compositions, the following experiment is described.

EXAMPLE

Stock solutions as follows were prepared.

Solution No. 1.—Syrup base

| Ingredient: | Amount/500 ml. of solution |
|---|---|
| Theophylline _____g__ | 5.1 |
| Glyceryl guaiacolate _____g__ | 3.0 |
| Sucrose _____g__ | 250.0 |
| Sodium saccharin _____g__ | 0.5 |
| Sodium cyclamate _____g__ | 3.0 |
| 70% sorbitol solution _____ml__ | 25.0 |
| Citric acid _____g__ | 2.0 |
| Sodium citrate _____g__ | 1.5 |
| Distilled water, q.s. _____ml__ | 400 |

Solution No. 2.—Alcohol solution

| Methylparaben _____g__ | 0.6 |
|---|---|
| Propylbaraben _____g__ | 0.15 |
| Ethyl vanillin _____g__ | 0.10 |
| Menthol (4% in ethanol) _____ml__ | 0.08 |
| Grenadine flavor _____ml__ | 0.04 |
| Ethyl alcohol _____ml__ | 78.95 |

Solution No. 3.—Ephedrine hydrochloride solution

| Ephedrine hydrochloride _____g__ | 0.8 |
|---|---|
| Distilled water, q.s. _____ml__ | 10.0 |

The amounts of barbiturates specified in the following list were then weighed and dissolved in a 79 ml. portion of the alcohol solution (Solution No. 2). This was then mixed with 400 ml. of Solution No. 1 and 10 ml. of Solution No. 3 was added thereto. The mixture was then diluted to 500 ml. with distilled water. In some instances the ingredients did not dissolve and stability studies were

| Barbituric acid derivative | Amount used per 500 ml. (g.) | Concentration per 15 ml. elixir (mg.) | Stability result |
|---|---|---|---|
| 5,5-diethyl- (barbital). | 9.9 | 300 | (¹). |
| 5-allyl-5-(2-pentyl)- (secobarbital). | 3.3 | 100 | (¹). |
| 5-ethyl-5-isoamyl- (amobarbital). | 1.65 | 50 | Precipitation occurred within 1 wk. |
| 5-ethyl-5-n-butyl- (butethal). | 3.3 | 100 | (¹). |
| 5-ethyl-1-methyl-5-phenyl (mephobarbital). | 1.98 | 60 | (¹). |
| 5-ethyl-5-(2-butyl)- (butabarbital). | 0.99 | 30 | Solution clear after 4 wks. storage at room temp., crystallization occurred at 0° C. after 4 wks. |
| 5,5-diallyl | 0.99 | 30 | Solution remained clear for 1 wk., but slight crystallization occurred both at room temp. and at 0° C. after 4 wks. |
| 5-allyl-5-cyclopent-1-enyl (cyclopal). | 3.3 | 100 | Solution remained clear at room temp. for 4 wks., but light crystallization occurred at 0° C. |
| 5-allyl-5-isobutyl- (itobarbital). | 6.6 | 200 | (¹). |
| 5-allyl-5-isopropyl- (aprobarbital). | 1.98 | 60 | Solution remained clear at room temp. for 4 wks. but slight crystallization occurred at 0° C. after 4 wks., but not after 1 wk. |
| 5-allyl-5-phenyl- (alphenyl). | 6.6 | 200 | (¹). |

¹ A clear solution failed to form on mixing the ingredients, and no stability studies were therefore initiated.

not then initiated with such sample. The solutions which formed satisfactorily were filtered to remove any foreign material, and put aside and stored in paired lots at 0° C. and at room temperature. They were examined after 4 weeks for crystallization.

In the preceding table there are identified the various barbiturates tested, the amounts used, and the dose thereof contained in 15 ml. of the final composition, to which the amount employed corresponds. In each instance this dose is a sedative dose of the barbiturate as specified in either the Merck Index, U.S.P. XVI, NF X or NF XI.

It is apparent from the foregoing that the results obtained with cyclopal, aprobarbital, and butabarbital are truly unexpected in view of the similarity of the chemical structures properties of these substances to closely related barbiturates which were found to be unsatisfactory. Refer, for instance, to itobarbital, diallylbarbituric acid, secobarbital, barbital, butethal, and the 5-phenyl barbiturates. Pentobarbital at a concentration of 10 mg./15 ml. provided a clear solution of the composition given in the foregoing example. This concentration of pentobarbital is slightly less than a sedative dose (the recommended dose is 30–500 mg.). Stable clear solutions having a sedative dose of 15 mg. of pentobarbital per 15 ml. of elixir can, however, be formulated as outlined above.

Attempts were made to formulate elixirs as described in the foregoing example using various concentrations of the barbiturates listed below. They proved to be unsatisfactory for failure to form clear solutions containing effective sedative amounts in volumes of 5–30 ml. of the elixir.

5-allyl-5-ethylbarbituric acid
5-methyl-5-phenylbarbituric acid
5-cyclohex-1-enyl-1,5-dimethylbarbituric acid (hexobarbital)
5-cyclohex-1-enyl-5-ethylbarbituric acid (cyclobarbital)
5-ethyl-5-phenylbarbituric acid (phenobarbital)

What is claimed is:

1. A bronchodilator-expectorant composition comprised of a solution containing at least 40% by volume of water and characterized by containing in each 5 milliliters thereof 16.6 to 175 mg. of theophylline, 7.5 to 350 mg. of glyceryl guaiacolate or an equivalent solubilizing weight of potassium guaiacol sulfonate or guaiacol, and from ⅙ to a full therapeutic dose of ephedrine, pseudoephedrine, methoxyphenamine, or protokylol, and from 2 to 35 mg. of cyclopal, aprobarbital, butabarbital, or pentobarbital.

2. The composition of claim 1 containing up to 20% by volume of alcohol.

3. The composition of claim 1 containing 4 to 25 mg. of ephedrine hydrochloride or ephedrine sulfate and from 2 to 15 mg. of butabarbital per 5 milliliters of elixir.

References Cited

UNITED STATES PATENTS 3,109,773  11/1963  Mercer et al. _____ 167—55

ALBERT T. MEYERS, Primary Examiner

D. M. STEPHENS, Assistant Examiner

U.S. Cl. X.R.

424—254, 278, 315, 330, 340